Sept. 11, 1934.    C. J. HUGHEY    1,973,484
DUPLEX CAMERA
Filed March 18, 1933    3 Sheets-Sheet 1

Sept. 11, 1934.　　　　C. J. HUGHEY　　　　1,973,484
DUPLEX CAMERA
Filed March 18, 1933　　　3 Sheets-Sheet 2

Inventor:
Carter J. Hughey,
By
Attorneys.

Patented Sept. 11, 1934

1,973,484

UNITED STATES PATENT OFFICE 1,973,484

DUPLEX CAMERA

Carter J. Hughey, Rochester, N. Y., assignor to Eastman Kodak Company, Rochester, N. Y., a corporation of New York Application March 18, 1933, Serial No. 661,511

9 Claims. (Cl. 271—2.3)

This invention relates to photography and more particularly to photographic cameras. One object of my invention is to provide a camera having a simple type of film drive and particularly adapted for use in photographing documents. Another object of my invention is to provide a camera in which film can be readily threaded into the two sides of the camera either both together or independently. Another object of my invention is to provide a driving mechanism for the two cameras, both of which may be driven from one side of the duplex camera. Another object of my invention is to provide a camera drive which can be moved in the threading operation manually and which may be later driven from a suitable power drive. Another object of my invention is to provide a power drive for the film in each side of the duplex camera and a drive which will cooperate with a suitable power driven member irrespective of the position of the driving member and other objects will appear from the following specification, the novel features being particularly pointed out in the claims at the end thereof.

Coming now to the drawings wherein like reference characters denote like parts throughout;

Figure 1:
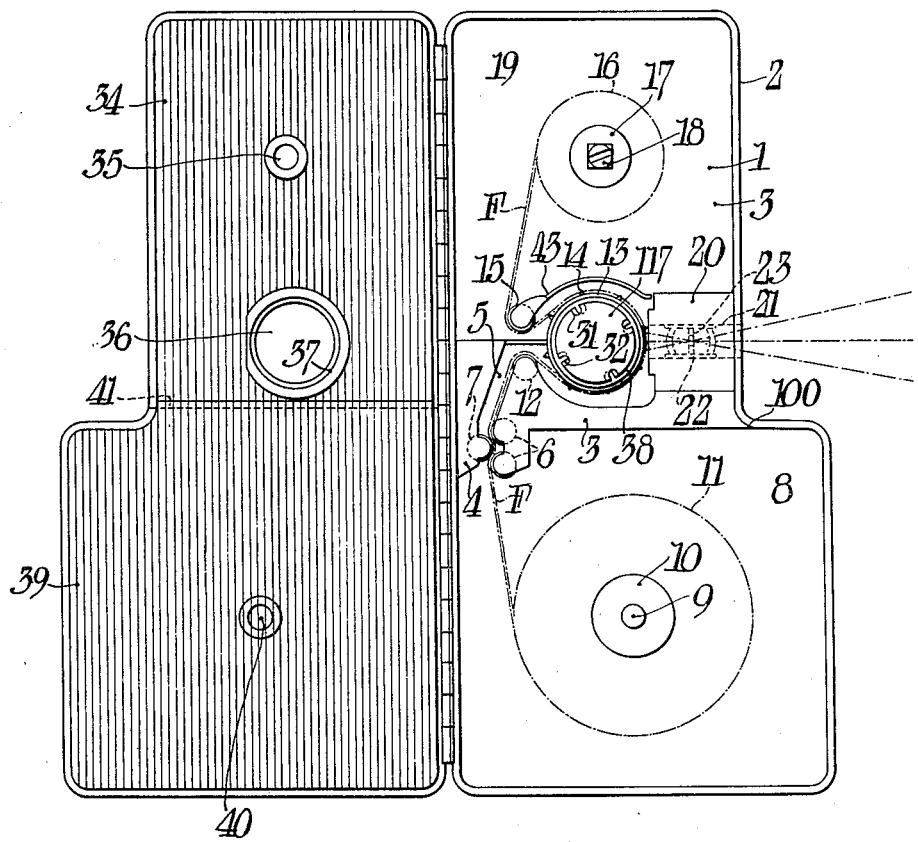
Fig. 1 is a side elevation of a camera constructed in accordance with and embodying a preferred form of my invention.

In the camera shown in the drawings as a preferred embodiment of my invention a duplex camera particularly designed for use in photographic recording machines is illustrated. In this type of camera the film is moved continuously past an exposure aperture while the documents being photographed are moved continuously in the focal plane of the objective of the camera. Such a device is shown in the copending application, Serial No. 478,838, filed August 30, 1930 in the name of R. S. Hopkins and Carter J. Hughey.

The camera may consist of a body portion 1 from which a flange 2 extends in both directions to form two box like compartments for the reception of film.

The two cameras formed by the duplex construction are alike so that only one need be described.

As indicated in Fig. 1 the flange 2 forms a box-like housing which is divided into two parts by means of the wall 3 and the wall 4, these two walls being separated by a channel 5 which is rendered light-tight by the pairs of rollers 6 and 7.

One of the two chambers 8 may be considered a supply chamber and is provided with a shaft 9 upon which hub 10 may be placed carrying a supply roll of film 11. From this supply roll the film F is drawn up through the channel 5 after being threaded between the rollers 6 and 7. The film is then led over a guide roller 12 around a sprocket 13 having teeth 14 for engaging the usual film apertures past a guide roller 15 and onto a take-up roll 16, this take-up roll comprising a hub 17 mounted on a shaft 18 which may be turned by a suitable drive as will be hereinafter more fully described.

Thus the supply of film is placed in chamber 8 and the take-up roll of film in chamber 19.

In the lower part of chamber 19 there is a block 20 which has a central bore or opening 21. Into this opening an objective carried by the tube 22 is positioned so as to focus an image of a document upon the film as it lies upon the sprocket 13. A suitable diaphragm 23 may be employed, this diaphragm usually being in the form of a comparatively narrow slot.

The operation of taking a picture merely comprises threading the film as above described and then rotating the sprocket 13 by a power drive in timed relation to the movement of documents in a separate part of a photographing machine as fully described in the copending application above referred to. The take-up hub 17 at the same time is driven by power.

Figure 3:
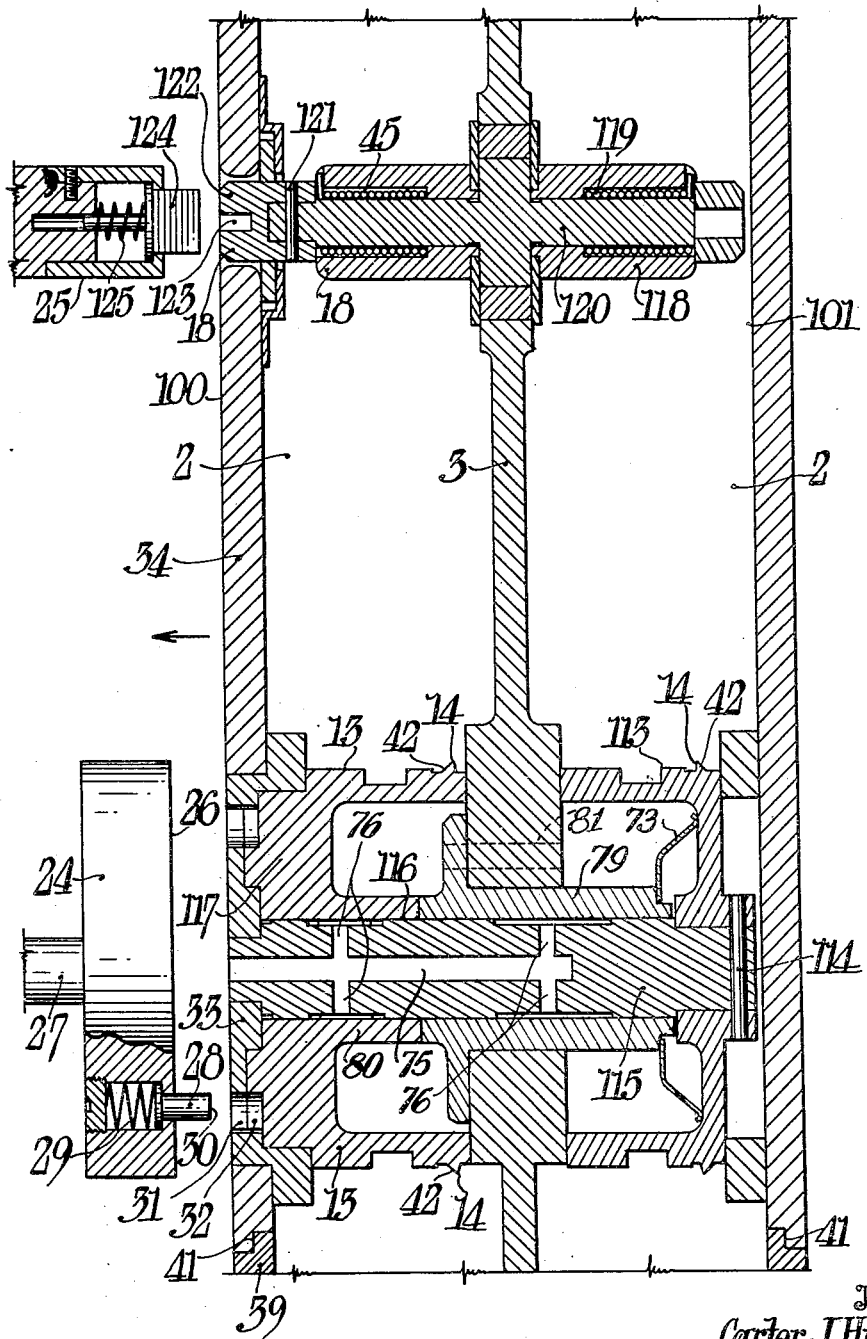
Fig. 3 is an enlarged sectional view through the camera drive.

As best illustrated in Fig. 3 the power drive for the sprocket is designated broadly as 24 and the power drive for the take-up is designated broadly as 25.

The power drive 24 consists of a disc 26 mounted on a power driven shaft 27 and carrying a spring pin 28. Pin 28 is normally thrust outwardly by means of the spring 29 but is capable of moving downwardly until the end 30 of the pin is substantially flush with the surface of the disc. The reason for this is that when the camera is moved in the direction shown by the arrow, Fig. 3, if the pin 28 does not lie opposite the driving apertures 31 and 32 of the disc 33 and the sprocket 13 the pin may turn idly over the surface of disc 33 and an aperture 31 is reached into which the pin may snap. The disc 33 is then turned until an aperture 32 is reached and the pin will then snap into this aperture. Engaging both of these apertures the driving member 24 will then turn the two sprockets together as will be later described.

The end 117 of the sprocket 13 in which the aperture 32 is formed is annular in shape and forms a disc member coaxial with the disc 33. The disc 117 is preferably made integral with the sprocket as shown in the drawings, but may be a separate piece if desired.

Figure 2:
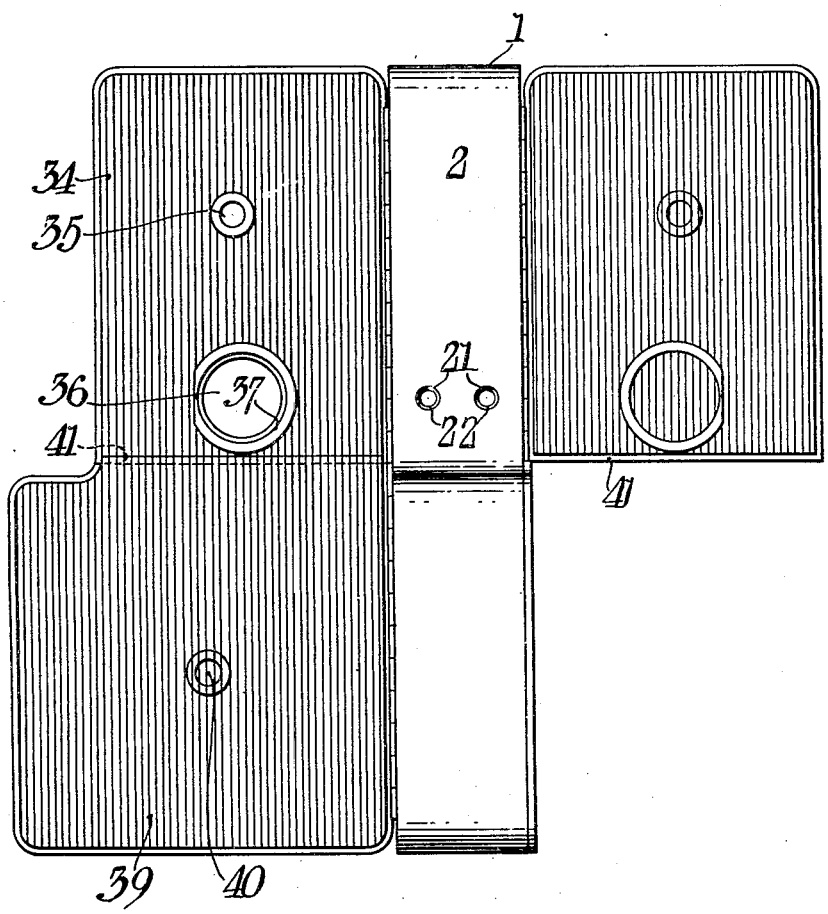
Fig. 2 is a front elevation of the camera shown in Fig. 1 with three of the four doors in an opened position.

Each side of the camera, as shown in Figs. 1 and 2, is provided with a pair of doors. Door 34 is provided with two openings 35 and 36. Opening 35 registers with and makes a light-tight connection with the end of the driving shaft 18 and aperture 36 includes a flange 37 which makes a light-tight connection with the flange 38 of the sprockets. The door 34 is adapted to cover the compartment 19. Compartment 8 may be covered by a door 39, this door having a hollow recess 40 which is adapted to engage the end of shaft 9 to properly position the film roll in compartment 8.

After the film has been loaded into compartment 8, threaded through the channel 5 and about sprocket 13, the door 39 may be closed to make the compartment 8 light-tight. There is a cooperating pair of flanges 41 carried by the doors 34 and 39, these flanges being so arranged that the door 39 must close compartment 8 before door 34 can close compartment 19, the reason for this being that a large supply of film may be placed in compartment 8 and if comparatively short lengths of film are wound upon the take-up hub these lengths can be removed while the supply roll is still retained in its light-tight closure.

In order to facilitate threading film onto the fixed sprocket 13 the teeth 14, as best shown in Fig. 3, are provided with a slanting wall 42. In loading the film into the operative position shown in Fig. 1 the film is moved downwardly into contact with the sprocket when the door 34 has been swung to the opened position shown in Fig. 1. When the film is pushed down between the partition 3 block 20 and guide 43, it may ride up over the tapered wall 42 of the teeth 14 and thus be easily and accurately positioned.

As above described the sprocket 13 may be driven when the pin 28 is in driving engagement with the aperture 32 thereof. In threading the film it may be necessary or desirable to turn the sprocket 13 in order to bring the proper amount of film for threading up to the take-up shaft 18. To do this the sprocket 13 can be manually turned and since the shaft 18 is provided with a frictional clutch in the form of a spring 45 this shaft can also be manually turned to properly locate the film.

After having threaded up one side 100 of the duplex camera it may be desirable to thread up the side 101. Therefore, it may also be desirable to thread sprocket 113 and to turn this sprocket separately from sprocket 13. In order to do this, sprocket 113 is pinned by a pin 114 to a shaft 115, this shaft passing entirely through a bore 116 in sprocket 13 and being fixedly attached to the disc 33. Thus when disc 33 is turned by the pin 28 engaging the aperture 31, the shaft 115 will be turned and with it sprocket 113. Shaft 115 is provided with an oil hole 75 from which branches 76 lead to the periphery of shaft 116 to facilitate lubricating this part in the bearing 79 and to lubricate the bearing portion 80 of the sprocket 13 since the sprocket 13 may turn relative to the shaft. Bearing 79 may be pinned to the wall 3 by means of a pin shown in dotted lines at 81.

Sprocket 113 can, therefore, be turned during the loading operation independently of sprocket 13 but when the power drive is put into operation the sprocket 13 will be turned just as soon as the pin 28 enters the aperture 31 in disc 33. Spring 73 is a friction spring tending to hold the sprocket 113 stationary through the pressure of the spring against the sprocket and against the end of bearing 79. Sprocket 13 will be turned as soon as pin 28 passes through aperture 31 into aperture 32.

In duplex camera 101 the take-up shaft 118 is connected by means of a one-way clutch 119 to the shaft 120 which passes through the power shaft 18 and is attached by means of a pin 121 to a clutch element 122 having a slot 123 adapted to receive a winding web 124. This web, like pin 28, is normally forced outwardly by a spring 125 so as to snap into the slot 123.

This permits the camera to be placed into operative position and into driving relation with the power driven elements of the photographing machine without first positioning the camera parts with respect to the driving elements since the construction of these parts permits them to enter into driving engagement as the parts rotate in case they do not happen to register with the clutch faces of the camera when initially placed in the machine.

Since either of the sprockets and either of the take-up shafts may be independently manually driven, the camera is a simple one to load and the parts need not be located in any definite position during the loading operation.

The teeth 14 of the sprockets by having one tapered wall 42 make the threading operation a very simple one since it is not necessary to thread the film apertures over the sprocket and to manually position the apertures upon the teeth. With the tapered teeth the film can be slid over the teeth and snapped into position correctly and easily.

The duplex camera above described can, of course, be used as a single camera with film in one side or as a double camera with film in both sides, the parts being operated from a single set of power driven elements on the recording machine.

What I claim is:

1. In a camera, the combination with a pair of sprockets, of a single shaft for supporting the two sprockets, one sprocket being keyed to said shaft and the other sprocket being mounted to turn freely thereon, and means for driving the two sprockets together including apertured disks connected to the respective sprockets, one turning with one sprocket and the other turning with the other sprocket whereby either sprocket may be turned relative to the other for threading the camera by hand, said sprocket driving means also including a power operated member adapted to engage and drive said disks in unison.

2. In a camera including a power drive, a pair of sprockets, of a single shaft for supporting the two sprockets, one sprocket being keyed to said shaft and the other sprocket being free to turn thereon, apertured driving disks, one being adapted to turn with each of the two sprockets, said power drive including a spring plunger adapted to engage one or both apertured disks.

3. In a camera, the combination with a pair of sprockets, of a single shaft for supporting the two sprockets, one sprocket being keyed to said shaft and the other sprocket being mounted to turn freely thereon, and means for driving the two sprockets together including apertured disks connected to the respective sprockets, one turning with one sprocket and the other turning with the other sprocket, said disks lying one over the other in a position in which the apertures of the disks may register, the means for driving the disks also including a driving pin adapted to engage both apertures in the disks, whereby a single driving pin may engage and drive both sprockets in unison.

4. In a camera having walls one including a circular opening, the combination with a pair of sprockets, of a single shaft for supporting the two sprockets, one sprocket being keyed to said shaft and the other sprocket being mounted to turn freely thereon, and means for driving the two sprockets together including apertured disks connected to the respective sprockets, one turning with one sprocket and the other turning with the other sprocket, one of said apertured disks including a flange forming a light tight joint with the circular opening of the wall of said magazine, whereby said disk may be turned from the outside of the magazine without permitting light to enter to the film.

5. In a camera, the combination with a pair of sprockets, of a single shaft for supporting the two sprockets, one sprocket being keyed to said shaft and the other sprocket being mounted to turn freely thereon, and means for driving the two sprockets together including apertured disks fastened to the sprockets, one turning with one sprocket and the other turning with the other sprocket, one of said apertured disks constituting a bearing on which said shaft may turn.

6. In a camera divided into two compartments, the combination with a pair of sprockets, one arranged coaxially of the other and each sprocket being located in separate compartments, a single shaft supporting both sprockets and means located on one compartment and including clutch members for driving said sprockets together, said means including mechanism through which either sprocket may be turned independently of the other for threading the separate compartments, a single power driven shaft, and a clutch member carried thereby for engaging the above-mentioned clutch members for driving them together.

7. In a camera, the combination with a sprocket, of a guard mounted fixedly with respect to the sprocket, of means included in the sprocket for facilitating loading film between the sprocket and guard comprising sprocket teeth having one tapered edge and one substantially straight edge, the tapered edge being adapted to guide film over the teeth, the substantially straight edge being adapted to position film sliding in an edgewise direction over the sprockets.

8. In a camera, the combination with a box-like receptacle having a fixed wall, of a sprocket located in said receptacle, film guards located near the sprocket forming a narrow film channel therebetween, of means included in the sprocket and comprising sprocket teeth having walls slanting toward said fixed wall whereby film thrust into the narrow film channel may ride up over said sprocket teeth in moving in an edgewise direction toward said fixed wall.

9. In a camera, the combination with a box-like receptacle having a fixed wall, of a sprocket located in said receptacle, film guards located near the sprocket forming a narrow film channel therebetween, of means included in the sprocket and comprising sprocket teeth having walls slanting toward said fixed wall and having opposite walls arranged substantially radially of said sprocket to facilitate threading, whereby a film may be thrust edgewise between the guards and the sprocket and towards the fixed wall and said film may slide up over the slanting tooth and may be positioned on said sprocket by said radial toothed wall.

CARTER J. HUGHEY.